Dec. 1, 1964    R. B. FREEMAN, SR    3,159,286
DRILL PIPE HANDLING APPARATUS
Filed Oct. 17, 1963    5 Sheets-Sheet 1
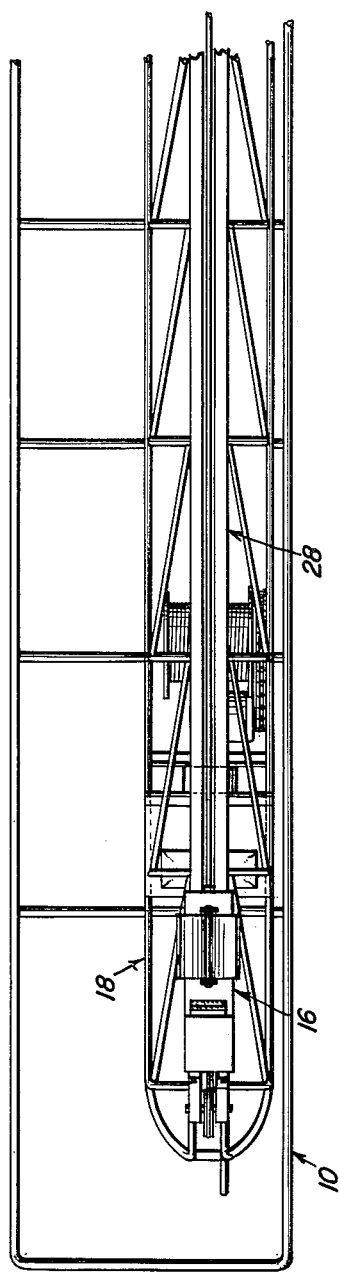
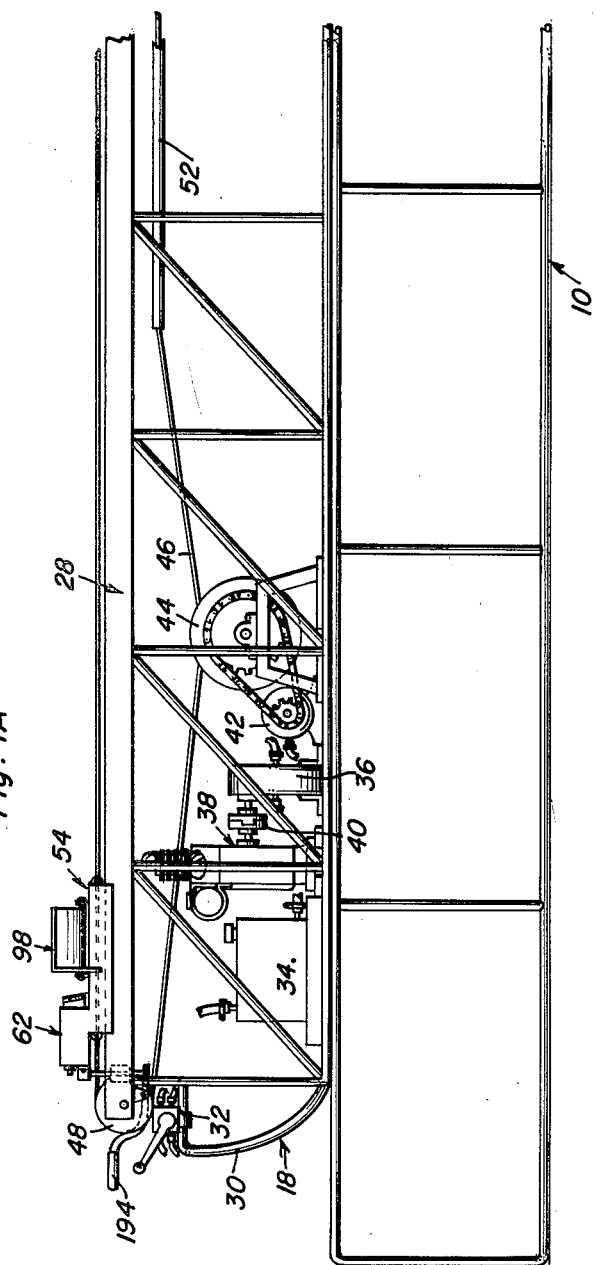
Richard B. Freeman, Sr.
INVENTOR.
BY *Clarence A. O'Brien*
and *Harvey B. Jacobson*
Attorneys

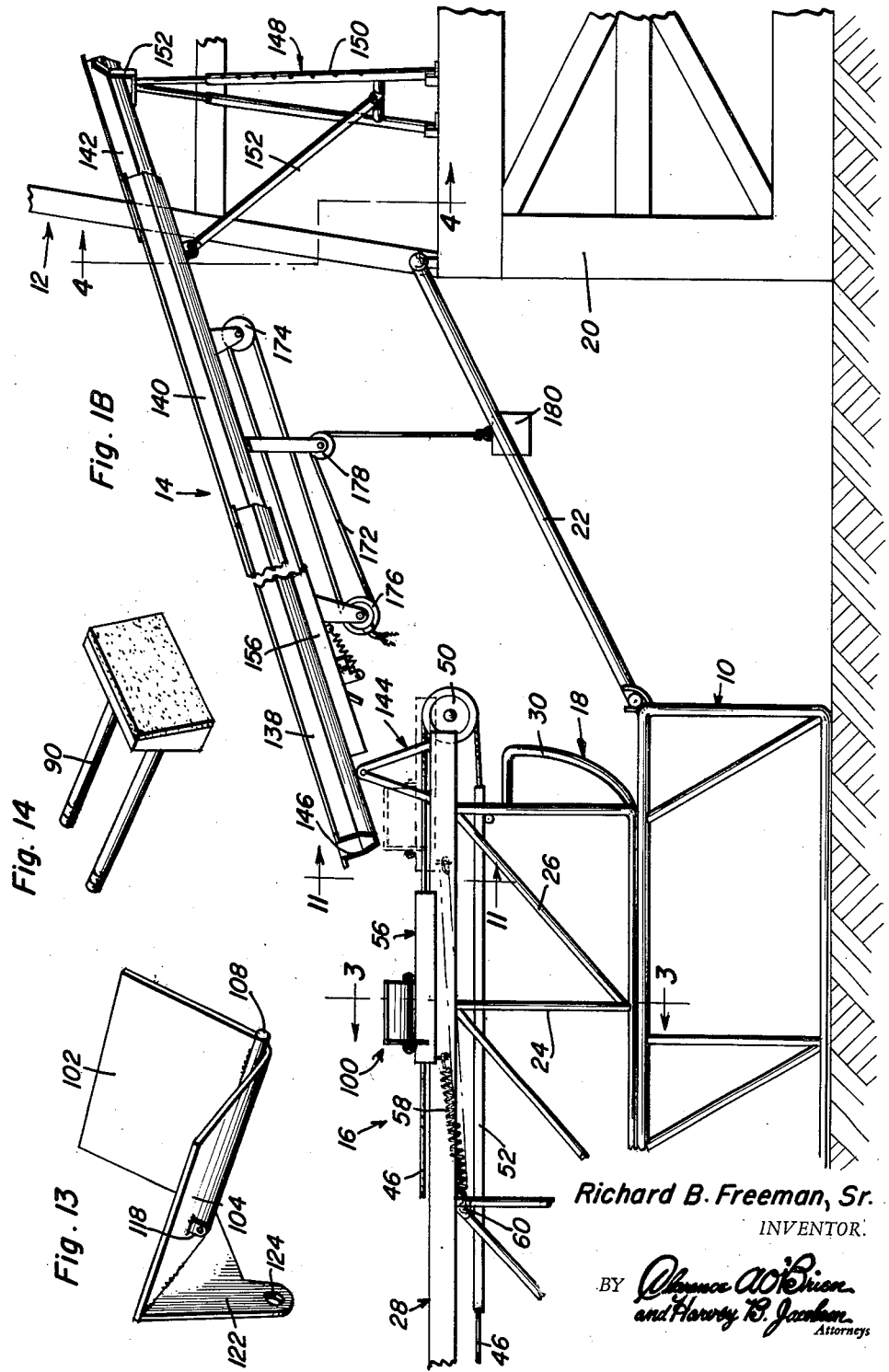

Dec. 1, 1964   R. B. FREEMAN, SR   3,159,286
DRILL PIPE HANDLING APPARATUS
Filed Oct. 17, 1963   5 Sheets-Sheet 3
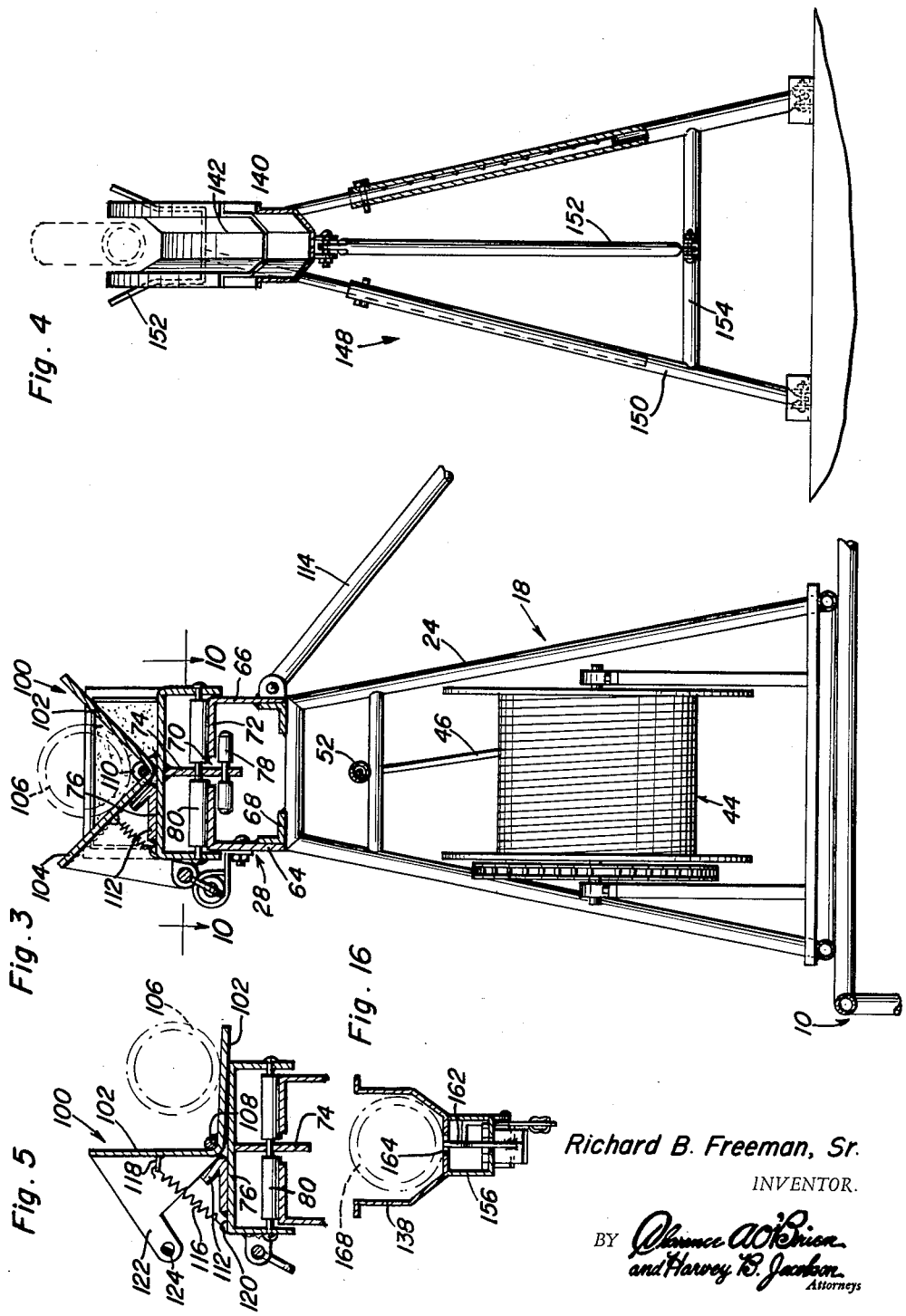
Richard B. Freeman, Sr.
INVENTOR.
BY Clarence A. O'Brien
and Harvey B. Jackson
Attorneys Dec. 1, 1964    R. B. FREEMAN, SR    3,159,286
DRILL PIPE HANDLING APPARATUS
Filed Oct. 17, 1963    5 Sheets-Sheet 4
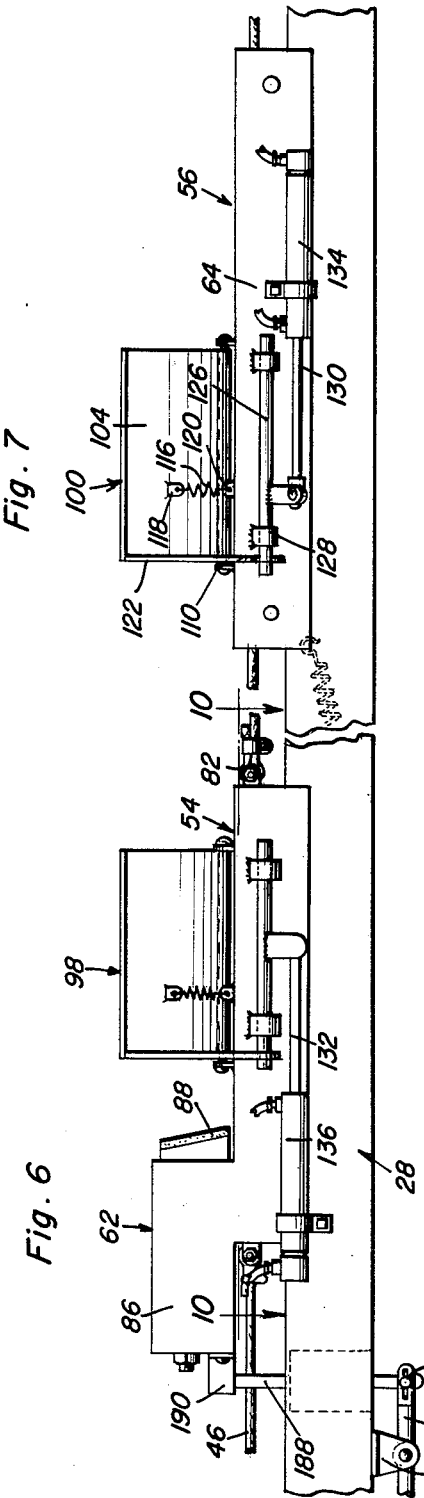
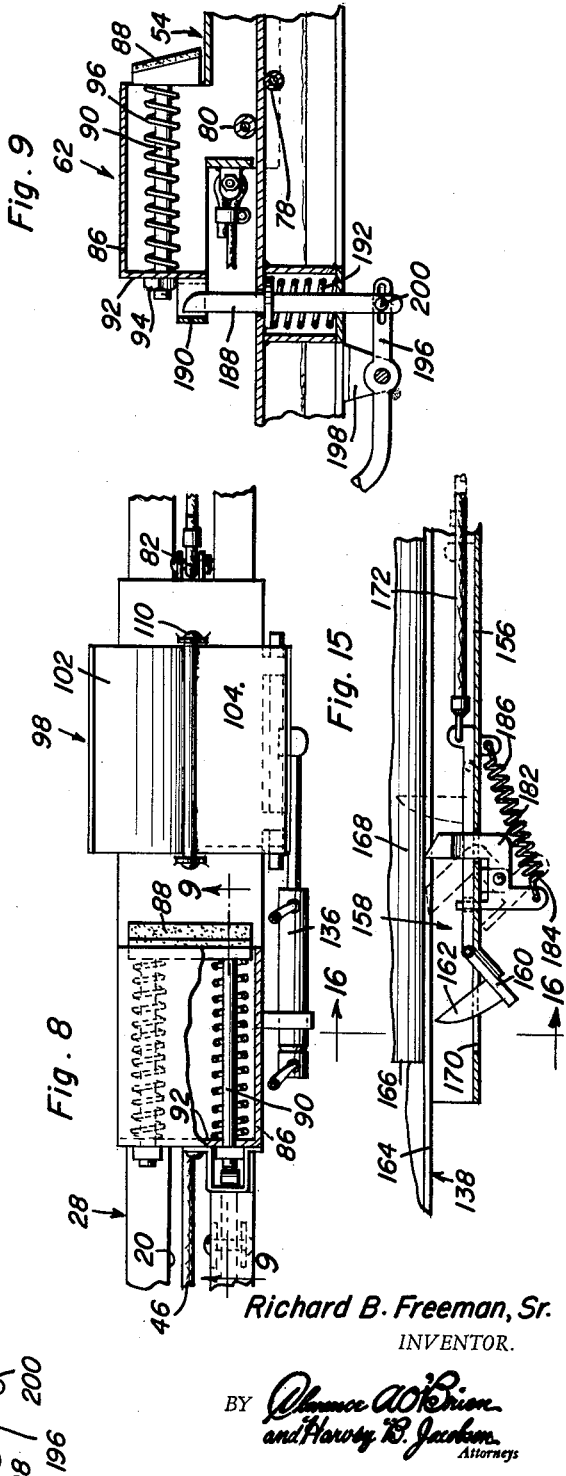
Richard B. Freeman, Sr.
INVENTOR.

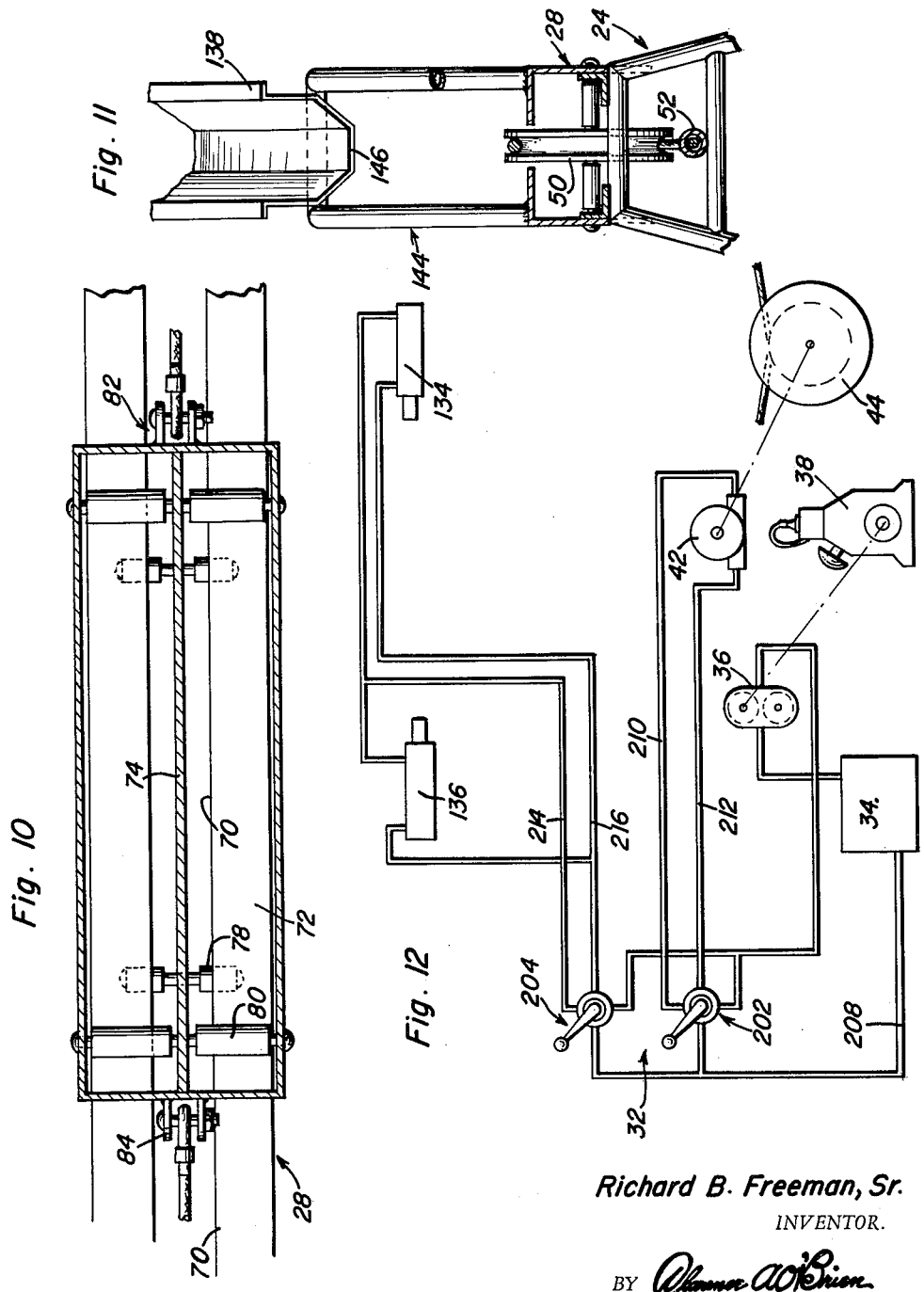

United States Patent Office 3,159,286
Patented Dec. 1, 1964

1

3,159,286
DRILL PIPE HANDLING APPARATUS
Richard B. Freeman, Sr., 1230 W. Main St., Houma, La.
Filed Oct. 17, 1963, Ser. No. 316,937
14 Claims. (Cl. 214—2.5)

This invention relates to apparatus for handling relatively large elongated articles such as drill pipe, and is an improvement over the apparatus disclosed in my prior copending application, U.S. Serial No. 130,927 filed August 11, 1961, with respect to which the present application is a continuation-in-part.

The apparatus of the present invention, like the apparatus disclosed in the prior copending application, is particularly suited for handling drill pipe received in a substantially vertical position from a drill rig by moving the drill pipe to a horizontal position and then laterally depositing the drill pipe in a stack.

In accordance with the present invention, apparatus is provided whereby the drill pipe is handled with less likelihood of damage occurring thereto.

An additional object of the present invention is to provide drill pipe handling apparatus capable of achieving the aforementioned objectives with respect to pipe of different lengths and in accordance with the requirements of different equipment.

As a further object of the present invention, the aforementioned objectives are achieved in a most reliable manner and with less complicated or costly structure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1A and 1B constitute a side elevational view of the apparatus of the present invention.

FIGURE 2 is a top plan view of the portion of the apparatus illustrated in FIGURE 1A.

FIGURE 3 is a partial transverse sectional view taken substantially through a plane indicated by section line 3—3 in FIGURE 1B.

FIGURE 4 is a partial transverse sectional view taken substantially through a plane indicated by section line 4—4 in FIGURE 1B.

FIGURE 5 is a partial transverse sectional view similar to the upper portion of FIGURE 3 but illustrating the apparatus in another operative condition.

FIGURE 6 is an enlarged elevational view of a portion of the apparatus illustrated in FIGURE 1A.

FIGURE 7 is an enlarged elevational view of a portion of the apparatus illustrated in FIGURE 1B.

FIGURE 8 is a top plan view of the apparatus as illustrated in FIGURE 6.

FIGURE 9 is a sectional view taken substantially through a plane indicated by section line 9—9 in FIGURE 8.

FIGURE 10 is a sectional view taken substantially through a plane indicated by section line 10—10 in FIGURE 6.

FIGURE 11 is a partial sectional view taken substantially through a plane indicated by section line 11—11 in FIGURE 1B.

FIGURE 12 is a hydraulic circuit diagram associated with the apparatus of the present invention.

FIGURE 13 is a perspective view of the releasable pipe-retaining member utilized on the apparatus of the present invention.

FIGURE 14 is a perspective view of the shock absorbing pad member utilized on the apparatus of the present invention.

FIGURE 15 is an enlarged partial sectional view showing a portion of the apparatus illustrated in FIGURE 1B.

FIGURE 16 is a partial transverse view taken substantially through a plane indicated by section line 16—16 in FIGURE 15.

Referring now to the drawings in detail, it will be observed from FIGURES 1A, 1B and 2, that the apparatus includes a base frame assembly 10 mounted on some supporting surface such as the ground in spaced adjacency to a drill rig 12 from which drill pipe is delivered in a substantially vertical position to a delivery chute generally referred to by reference numeral 14 for gravity feed of the drill pipe toward a transport mechanism generally referred to by reference numeral 16 movably mounted by a track frame assembly 18 supported on the base frame assembly 10 in spaced relation above the ground. The transport mechanism 16 is therefore movably mounted for movement in a generally horizonal direction in order to receive the drill pipe from the chute 14. The base frame assembly 10 is adjustably spaced from the base portion 20 of the drill rig 12 and may be connected thereto by the link member 22 as seen in FIGURE 1B. The track frame assembly mounted on the base frame assembly is formed by a plurality of spaced A frame sections 24 as more clearly seen in FIGURE 3, said A frame sections being interconnected by brace members 26 and supporting on the top thereof, an elongated track structure generally referred to by reference numeral 28. End supporting sections 30 are secured to opposite longitudinal ends of the track frame assembly 18 below the track structure 28. The end section 30 illustrated in FIGURE 1A mounts thereon hydraulic controls generally referred to by reference numeral 32 associated with hydraulic operating equipment mounted within the track frame assembly 18 adjacent to the rear end thereof as seen in FIGURE 1A. The hydraulic equipment includes a fluid reservoir 34 from which fluid is withdrawn by a pump device 36 as part of a closed fluid circuit, the pump being driven by an internal combustion engine 38 or other source of power coupled to the pump by any suitable coupling such as coupling 40. Also associated with the closed hydraulic circuit is a reversible fluid motor 42 by means of which a winch drum 44 is driven in order to displace in opposite directions, a cable 46 associated with the transport mechanism 16. The cable is therefore anchored to the winch drum 44 and is entrained about idler pulleys 48 and 50 rotatably mounted at opposite longitudinal ends of the track structure 28. The cable is therefore connected to the transport mechanism 16 above the track structure and is guided below the track structure by a guide tube 52 secured to the track frame assembly in parallel spaced relation below the track structure.

The transport mechanism includes a travelling carriage 54 slidably mounted on the track structure 28 and connected to the cable 46 for movement between an unloading position at which the carriage 54 is located as illustrated in FIGURE 1A to a loading position abutting a loading carriage 56 when in the dotted line position illustrated in FIGURE 1B, the loading carriage 56 being also slidably mounted on the track structure 28 but not anchored to the cable 46 which extends therethrough. Instead, the loading carriage 56 is connected to one end of an energy storing spring 58, the other end of said spring being anchored to the track frame at a location 60 just below the track structure as illustrated in FIGURE 1B whereby the carriage 56 is sequentially accelerated and decelerated upon movement of the travelling carriage 54 from the loading position to the unloading position. In this manner, drill pipe received on the carriages in the loading positions, will be effectively accelerated toward the unloading position and then decelerated as the unloading position is approached. Also, as the drill pipe approaches the unloading position, any movement of the drill pipe relative to the carriages will be arrested by a shock absorber device 62 mounted on the travelling carriage 54.

Referring now to FIGURES 3, 6, 7 and 10, it will be observed that the track structure on which the carriages are slidably mounted is constructed of a downturned channel member the downturned channel sides 64 and 66 of which are secured to the top of the track frame assembly 18 by elongated angle iron members 68. A slot 70 is formed on the top web portion 72 of the track structure so as to receive therethrough, a downwardly projecting plate member 74 welded to the top wall portion 76 of each carriage. The plate member 74 rotatably mounts two spaced pairs of rollers 78 below the top portion 72 of the track structure on opposite sides of the longitudinal slot 70 therein. Also mounted by the plate member 74 of each carriage are spaced pairs of longer rollers 80 engaging the top of the portion 72 of the track structure spaced from the smaller rollers 78 so as to provide a firm yet nonbinding roller support for the carriages on the track structure. In the case of the carriage 54, pivot connections 82 and 84 are mounted at opposite longitudinal ends to which the cable from the winch drum 44 is connected in order to effect displacement of the travelling carriage 54 in opposite directions along the track structure. Also in the case of the carriage 54, the shock absorber 62 is mounted at the rear end thereof and includes an upwardly projecting frame portion 86. The frame portion 86 slidably mounts a shock absorbing pad member 88 by means of a pair of guide rods 90 secured thereto as more clearly seen in FIGURES 8, 9 and 14. The frame portion 86 therefore has a rear closed end portion 92 slidably mounting the guide rods 90 to which the nuts 94 are threadedly mounted so as to limit movement of the pad member 88 in a forward direction under the bias of the spring elements 96 mounted on the guide rods 90 and reacting between the pad members and the rear portion 92 of the frame 86. The pad member 88 therefore projects from the frame portion 86 spaced rearwardly behind the retaining wall member 98 which is pivotally mounted on the carriage 54 in order to hold the forward end portion of the drill pipe thereon. A similar retaining wall member 100 is pivotally mounted on the other carriage 56.

Referring now to FIGURES 3, 5, 6, 7, 8 and 13, it will be observed that each of the retaining wall members includes upwardly diverging wall sections 102 and 104 between which the drill pipe 106 is retained as shown by dotted line in FIGURE 3. A pivot rod 108 may therefore be welded to the retaining wall member between the diverging wall sections so as to pivotally mount the retaining wall member on the carriage between pivot brackets 110 secured to the top of the carriages at opposite longitudinal ends of the pivot rod 108. Also mounted on the top portion 76 of each of the carriages on one side of the pivot rod 108, is a stop element 112 preventing angular movement of the retaining wall member in one angular direction. Accordingly, when the retaining member is released, it will be angularly displaced in one direction under the weight of the drill pipe as shown in FIGURE 5 so that the drill pipe may roll off the carriages onto guide rods 114 pivotally connected to the track structure side 66, as seen in FIGURE 3. The drill pipe may thereby be deposited at adjusted heights in order to form a stack as more particularly described in the aforementioned prior copending application. In order to return the retaining members to the retaining position illustrated in FIGURE 3, after the drill pipe has been discharged therefrom, a relatively light return spring 116 is provided, one end of the return spring being anchored to the wall section 102 by the bracket 118, while the opposite end of the return spring is anchored to the top 76 of the carriage by the anchor 120. The retaining members 98 and 100 are however held in the retaining position with the drill pipe supported therein by means of a laterally extending projection 122 secured to one longitudinal end of the wall section 104, said projections being provided with an aperture 124 through which a sliding latch 126 extends, the sliding latch being slidably mounted on the side 64 of the carriages by a pair of spaced slide brackets 128. The slide latches 126 associated with the carriages are therefore respectively connected to piston rods 130 and 132 which extend from fluid cylinder devices 134 and 136 secured to the sides 64 of the carriages for the purpose of retracting and relatching the slide latches 126 to either support the drill pipe between the carriages or permit the drill pipe to roll off the carriages as aforementioned.

Referring now to FIGURES 1B, 4 and 11, it will be observed that the chute 14 is of such construction and arrangement as to accommodate different installations. Accordingly, the chute is composed of relatively extensible sections 138, 140 and 142. The lower section 138 is pivotally supported at the forward end of the track structure by means of the support bracket assembly 144 so that the outlet end 146 is disposed at the proper height for transferring the drill pipe onto the retaining members of the carriages. The upper end sections 140 and 142 on the other hand, are adjustably supported on the base 20 of the rig at an adjustable angle by means of the adjustable supporting assembly 148. The adjustable supporting assembly therefore includes a pair of extensible leg portions 150 pivotally anchored to the base 20 and being interconnected at the upper ends thereof to a support bracket 152 receiving the upper end of the upper chute section 142. A link member 154 is pivotally connected at its opposite ends to the bottom of the chute section 140 and the cross brace member 154 interconnected with the extensible leg portions 150. It will therefore be apparent, that the length of the chute assembly 14 and its inclination may be adjusted in accordance with the required distance between the drill rig and the transport mechanism 16 and the required inclination thereof.

Referring now to FIGURES 1B, 15 and 16, it will be observed that facilities are provided for retarding movement of the drill pipe down the delivery chute 14 in order to prevent damage thereto that would otherwise occur should the drill pipe be deposited on the carriages at too great a speed. An elongated slide frame 156 is therefore mounted below the chute section 138 within which a slide member 158 is mounted having a forward portion 160 pivoted to the main body of the slide and carrying an upward projection 162 adapted to project upwardly through a slot 164 formed in the bottom of the chute section 138 in order to engage the forward end 166 of the drill pipe 168 descending the delivery chute. Formed adjacent the lower end of the slide frame 156, is an opening 170 into which the forward hinge portion 160 of the slide 158 may drop in order to retract the projection 162 from the chute. Accordingly, when the drill pipe approaches the outlet end of the delivery chute, it will be released from the slide which is moved downwardly through the slide frame by the drill pipe up to that point. One end of a cable 172 is therefore connected to the slide 158, this cable being entrained about an idler pulley 174 rotatably mounted below the delivery chute and a pulley to which an electric retarding brake 176 is connected, the cable being finally entrained about an intermediate pulley 178 from which the cable extends for connection to a counter-balancing weight 180. The counterbalancing weight will therefore urge the slide 158 upwardly against the pull exerted thereon by the downwardly descending drill pipe. Also, downward movement of the slide will be retarded by the electric brake 176 so as to decelerate movement of the drill pipe. Thus the drill pipe will be effectively slowed down when it leaves the delivery chute at which time the projection 162 of the slide is retracted from the bottom of the chute. In order to hold the slide at its lower end until the drill pipe has left the delivery chute, a latch element 182 is pivotally mounted spaced from the opening 170 by means of the pivot bracket 184. The latch element 182 will be held in engagement with the slide 158 so as to prevent upward return movement thereof while the drill pipe 168 is in the delivery chute. Once the drill pipe has left the delivery chute, the latch spring 186 will retract the latch out of engagement with the slide so that it may be returned to its upper position under the urge of the counterbalancing weight 180 in preparation for engagement with the next drill pipe deposited at the upper end of the delivery chute. Thus, damage to the drill pipe is avoided where a delivery chute of considerable length and inclination is necessary and where a substantially massive length of drill pipe is involved.

As hereinbefore indicated, acceleration and deceleration of the drill pipe supported on the carriages 54 and 56 by the retaining support members of the transport mechanism will effectively bring the drill pipe to the unloading position without damage thereto. The position of the carriages for loading purposes will depend upon the distance to which the travelling carriage 54 is displaced from the unloading position against the bias of the spring 58 rendering it operative to accelerate the carriages when the travelling carriage 54 is moved in the opposite direction toward the unloading position. The travelling carriage 54 must however be positively limited in its movement toward the loading position, this being effected by a retractable stop element 188 slidably mounted adjacent the rear end of the track structure as more clearly seen in FIGURES 1A, 6 and 9. Therefore, a stop bracket 190 is secured to the rear end portion 92 of the shock absorber frame 86 for abutment with the stop element 188 in order to limit rearward movement of the carriage 54. The stop element 188 is slidably retracted in a vertical direction against the bias of the spring 192 by means of the handle 194 formed at the end of the lever 196 pivotally mounted by the pivot bracket 198 adjacent the rear end of the track structure, the lever element 196 being connected to the stop element 188 by the pin and slot connection 200. Accordingly, when the travelling carriage 154 is in the unloading position, the handle 194 may be utilized to latch it in said position in order to prevent the carriage from movement from the unloading position until the drill pipe is unloaded. After unloading, the stop element 188 may then be retracted so as to release the travelling carriage 154 in order to permit its return to the loading position under control of the hydraulic controls 32.

Referring now to FIGURES 1A and 12, it will be observed that the hydraulic controls include two selector valve assemblies 202 and 204. The selector valve assembly 202 may therefore be manipulated in order to reverse hydraulic connections between the pressure discharge line 206 and return line 208 with the lines 210 and 212 to the reversible fluid motor 42. The motor 42 may thereby be operated in reverse directions in order to drive the cable winch 44 for movement of the travelling carriage 54 between the loading and unloading positions. Thus, upon release of the carriage 54 from the unloading position aforementioned, the selector valve 202 may be actuated toward one operative position in order to cause the travelling carriage 54 to be moved toward the unloading position displacing the loading carriage 56 against the bias of the spring 58 in preparation for receipt of a drill pipe from the delivery chute 14. Thereafter, movement of the valve 202 to the other operative position will cause movement of the travelling carriage 54 toward the unloading position in order to move the drill pipe toward the unloading position, its acceleration and deceleration being controlled by the action of the spring 58 on the carriage 56 as aforementioned. Once the carriages are in the unloading position, the selector valve 204 may be actuated to an unloading position reversing the hydraulic connections between the lines 206 and 208 with the lines 214 and 216 in order to simultaneously retract the piston rods into the cylinder devices 134 and 136 in order to unlatch the retaining support members 98 and 100 permitting the drill pipe to roll off onto the guide rods 114 pivotally connected to one side of the track structure. After the drill pipe has rolled off of the retaining members, they are returned to the retaining position by the return springs 112 so that they may then be relatched by movement of the selector valve assembly 204 to the loading position. Thereafter, the carriages may be returned to the loading position under control of the valve assembly 202 as aforementioned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a delivery chute from which elongated members are gravity fed, an article handling and unloading device comprising; a track frame, a pair of carriages slidably mounted on said track frame, biasing means mounted on said track frame and operatively connected to one of said carriages for controlling acceleration and deceleration thereof upon displacement of the other of said carriages from a loading to an unloading position, selectively controlled stop means mounted on said track frame for limiting movement of the other of the carriages to said unloading position and holding said other carriage in said unloading position, shock absorbing means mounted on said other carriage for absorbing impact of an elongated member accelerated by said one carriage, releasable support means mounted on said carriages for supporting the elongated member therebetween, unloading means operatively connected to said releasable support means for discharging the elongated member from the carriages when the other carriage is held in the unloading position, and carriage displacing means operatively connected to said other carriage for alternatively displacing said one carriage to the loading position and said other carriage to the unloading position.

2. The combination of claim 1 including feed retarding means operatively mounted by the delivery chute and engageable by the elongated members for deceleration thereof when received by the releasable support means on the carriages.

3. The combination of claim 2 wherein said releasable support means includes a retaining wall member pivotally mounted on each carriage about an axis generally parallel to the elongated member for angular displacement transverse to said axis under the weight of said elongated member, means for confining angular displacement of the retaining member to one direction from a member-retaining position, and means for returning the retaining member to said member-retaining position after discharge of the elongated member.

4. The combination of claim 3 wherein said biasing means for controlling acceleration and deceleration of said one carriage comprises, a spring member anchored at one end thereof to the track frame and connected at the opposite end thereof to said one carriage resisting displacement thereof to the loading position.

5. The combination of claim 4 wherein said shock absorbing means comprises, a pad member slidably mounted by said other carriage spaced from a side of the releasable support means remote from said one carriage, and spring means biasing said pad member toward the releasable support means.

6. The combination of claim 5 wherein said unloading means comprises, a lateral projection mounted on each of the retaining members of the releasable support means, latch means movably mounted on the carriages for engaging the lateral projections to hold the retaining members in the member-retaining position, and fluid-operated means for withdrawing said latch means from engagement with the lateral projections.

7. The combination of claim 1 wherein said releasable support means includes a retaining wall member pivotally mounted on each carriage about an axis generally parallel to the elongated member for angular displacement transverse to said axis under the weight of said elongated member, means for confining angular displacement of the retaining member to one direction from a member-retaining position, and means for returning the retaining member to said member-retaining position after discharge of the elongated member.

8. The combination of claim 7 wherein said unloading means comprises, a lateral projection mounted on each of the retaining members of the releasable support means, latch means movably mounted on the carriages for engaging the lateral projections to hold the retaining members in the member-retaining position, and fluid-operated means for withdrawing said latch means from engagement with the lateral projections.

9. The combination of claim 1 wherein said biasing means for controlling acceleration and deceleration of said one carriage comprises, a spring member anchored at one end thereof to the track frame and connected at the opposite end thereof to said one carriage resisting displacement thereof to the loading position.

10. The combination of claim 9 including feed retarding means operatively mounted by the delivery chute and engageable by the elongated members for deceleration thereof when received by the releasable support means on the carriages.

11. The combination of claim 9 wherein said shock absorbing means comprises, a pad member slidably mounted by said other carriage spaced from a side of the releasable support means remote from said one carriage, and spring means biasing said pad member toward the releasable support means.

12. The combination of claim 1 wherein said shock absorbing means comprises, a pad member slidably mounted by said other carriage spaced from a side of the releasable support means remote from said one carriage, and spring means biasing said pad member toward the releasable support means.

13. In combination with a delivery chute from which elongated members are gravity fed, an article handling and unloading device comprising, a track frame connected to said chute, transport means mounted on said frame for movement between an unloading position on the frame remote from said chute and a loading position closer thereto, energy storing means operatively connected to the transport means rendered operative to sequentially accelerate and decelerate an elongated member relative to the frame in response to movement of the transport means in one direction from the loading position to the unloading position, means mounted on the transport means for yieldably limiting movement of the elongated member relative thereto in said one direction, stop means for positively limiting movement of the transport means in said one direction to the unloading position and selectively controlled means for displacing the transport means in the opposite direction to the loading position rendering said energy storing means operative.

14. The combination of claim 13 wherein said transport means comprises, a travelling carriage movable by the selectively controlled means, and a loading carriage connected to the energy storing means and displaceable by the travelling carriage.

No references cited.